(12) United States Patent
Bergquist

(10) Patent No.: US 8,840,502 B2
(45) Date of Patent: Sep. 23, 2014

(54) POWERTRAIN FOR A VEHICLE AND METHOD FOR CONTROLLING A POWERTRAIN

(75) Inventor: Mikael Bergquist, Huddinge (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 14/129,430

(22) PCT Filed: Jun. 18, 2012

(86) PCT No.: PCT/SE2012/050667
§ 371 (c)(1),
(2), (4) Date: Dec. 26, 2013

(87) PCT Pub. No.: WO2013/002706
PCT Pub. Date: Jan. 3, 2013

(65) Prior Publication Data
US 2014/0128214 A1     May 8, 2014

(30) Foreign Application Priority Data
Jun. 27, 2011     (SE) ........................................ 1150592

(51) Int. Cl.
*F16H 3/72*     (2006.01)
*B60K 6/387*     (2007.10)
*B60W 20/00*     (2006.01)
*B60K 6/48*     (2007.10)

(52) U.S. Cl.
CPC ........ *B60W 20/40* (2013.01); *F16H 2200/2005* (2013.01); *Y10S 903/902* (2013.01); *Y02T 10/6221* (2013.01); *F16H 3/724* (2013.01); *B60Y 2400/421* (2013.01); *F16H 2200/2064* (2013.01); *B60K 6/387* (2013.01); *B60K 6/48* (2013.01)
USPC .............................................. 475/5; 903/902

(58) Field of Classification Search
CPC ...................................... F16H 1/28; F16H 3/72
USPC ............................................................. 475/5
See application file for complete search history.

(56) References Cited

U.S. PATENT DOCUMENTS 5,558,173 A * 9/1996 Sherman ...................... 180/53.8
6,428,438 B1   8/2002 Bowen
(Continued)

FOREIGN PATENT DOCUMENTS

DE  10 2009 046366 A1  5/2011
EP       0 710 787 A2   5/1995
EP       2 161 154 A1   3/2010

OTHER PUBLICATIONS

International Preliminary Report on Patentability dated Aug. 8, 2013 issued in corresponding International patent application No. PCT/SE2012/050667.

(Continued)

*Primary Examiner* — Edwin A Young
(74) *Attorney, Agent, or Firm* — Ostrolenk Faber LLP

(57) ABSTRACT

A propulsion device (2) for a vehicle including an output shaft (14) of a combustion engine (4), an input shaft (27) of a gearbox (8), an electrical machine (6) having a stator (24) and a rotor (26), and a planetary gear (10) including movable components (18, 20, 22). A locking sleeve (38) is movable between first and second positions. In the first position, the engine output shaft (14) and the gearbox input shaft (27) are allowed to rotate at different speeds via the planetary gear (10). In the second position, the locking sleeve (38) firmly connects the engine output shaft (14) to the gearbox input shaft (27) via the planetary gear (10). Also a method for controlling such a propulsion device (2) is disclosed.

13 Claims, 5 Drawing Sheets

(56) References Cited

U.S. PATENT DOCUMENTS

2003/0078127 A1     4/2003   Kramer
2010/0032218 A1*   2/2010   Ideshio et al. ........... 180/65.225
2011/0111910 A1*   5/2011   Ideshio et al. .................... 475/5

OTHER PUBLICATIONS

International Search Report dated Nov. 20, 2012 issued in corresponding International patent application No. PCT/SE2012/050667.

* cited by examiner

POWERTRAIN FOR A VEHICLE AND METHOD FOR CONTROLLING A POWERTRAIN

CROSS-REFERENCE TO RELATED APPLICATIONS

The present application is a 35 U.S.C. §§371 national phase conversion of PCT/SE2012/050667, filed Jun. 18, 2012, which claims priority of Swedish Patent Application No. 1150592-2, filed Jun. 27, 2011, the contents of which are incorporated by reference herein. The PCT International Application was published in the English language.

BACKGROUND TO THE INVENTION AND PRIOR ART

The present invention relates to a propulsion device for a vehicle and to a method for controlling such a propulsion device.

Hybrid vehicles may be powered by a primary prime mover which may be a combustion engine, and by a secondary prime mover which may be an electrical machine. The electrical machine will be equipped with at least one battery to store electrical energy and with regulating equipment to regulate the flow of electrical energy between the battery and the electrical machine. The electrical machine may thus serve alternately as motor and generator, depending on the vehicle's operating state. When the vehicle is braked, the electrical machine generates electrical energy which is then stored in the battery. The stored electrical energy is subsequently for operation of the vehicle.

Using a conventional clutch mechanism which disconnects the gearbox input shaft from the engine during gearchange processes in the gearbox involves disadvantages, e.g. warming of the clutch mechanism's discs, resulting in greater fuel consumption and in clutch disc wear. In addition, a conventional clutch mechanism is relatively heavy and expensive. It also occupies a relatively large amount of space in the vehicle.

Connecting the engine output shaft, the electrical machine's rotor and the gearbox input shaft to a planetary gear makes it possible to dispense with the conventional clutch mechanism. Acceleration of the vehicle will deliver increased torque from the engine and the electrical machine to the gearbox and thence to the vehicle's powered wheels. The fact that both the engine and the electrical machine are connected to the planetary gear means that the maximum torque deliverable by the engine and the electrical machine will be limited by whichever of these prime movers has lower maximum torque than the other. Should the maximum torque of the electrical machine be lower than that of the engine, the electrical machine will not be able to generate sufficient reaction torque to the planetary gear, with the result that the engine cannot transmit its maximum torque to the gearbox and thence to the vehicle's powered wheels. The maximum torque transferrable to the gearbox is therefore limited by the power of the electrical machine. In particular, when powerful acceleration of the vehicle is desired and the electrical machine cannot generate sufficient reaction torque, undesirable heat will be generated in the electrical machine.

Specification US-A1-2003/0078127 refers to a propulsion system for a vehicle with a combustion engine and an electric motor which are connected to a planetary gear. The planetary gear's planet wheel carrier is connected to an input shaft of a gearbox. The planet wheel carrier and the planetary gear's sunwheel can be firmly connected by a sleeve so that the electrical machine and the gearbox input shaft can rotate as a fixed rotating unit.

The space available for the propulsion device in a vehicle is often limited. If the propulsion device comprises a plurality of components, e.g. a combustion engine, an electrical machine, a gearbox and a planetary gear, the configuration needs to be compact. For this reason it is desired that the dimensions of the electrical machine be small, which limits its power and maximum possible torque generation.

The components of the propulsion device are also required to be of high reliability and high operational safety and be capable of transmitting a large torque while at the same time having small dimensions and low weight.

SUMMARY OF THE INVENTION

The object of the present invention is to propose a vehicle propulsion device which is of compact construction.

Another object of the invention is to propose a vehicle propulsion device which is of high reliability and high operational safety.

A further object of the invention is to propose a vehicle propulsion device with torque-transmitting components which have small dimensions and low weight.

These objects are achieved with the propulsion device herein.

They are also achieved with a method for controlling the propulsion device herein.

The fact that the locking sleeve firmly connects the engine output shaft to the gearbox input shaft via the planetary gear makes it possible to achieve desired acceleration of the vehicle while at the same time the dimensions and power of the electrical machine can be limited, resulting in a compact propulsion device with limited dimensions. It also makes it possible for the maximum torque which the electrical machine can generate to be lower than the maximum torque which can be generated by the engine. The fact that the locking sleeve firmly connects the engine output shaft to the gearbox input shaft via the planetary gear makes it possible to achieve a large torque arm, which means that the locking sleeve and also components of the planetary gear can be of small dimensions and low weight.

According to an embodiment of the invention, the locking sleeve is provided with splines which in a first position engage with splines of a first movable component of the planetary gear and in a second position engage also with splines on a second movable component of the planetary gear. This makes it possible for the locking sleeve and the planet wheel carrier to be of small dimensions and low weight. A splined connection also makes it possible to achieve a compact configuration which is also of high reliability and high operational safety.

According to a further embodiment, the locking sleeve has at least one recess in which at least one spigot on the first movable component is configured to engage. The recess and the spigot result in reliable movement of the locking sleeve between the first and second positions.

According to a further embodiment, at least one recess in the locking sleeve is so configured that the locking sleeve is kept in the second position when the at least one spigot is inserted in a locking portion formed in the recess and the locking sleeve and the second movable component rotate about a common axis of rotation. Thus no further means are required to keep the locking sleeve in the second position, resulting in a compact configuration, high reliability and high operational safety.

A planetary gear usually comprises three components arranged for rotation relative to one another, viz. a sunwheel, a planet wheel carrier and a ring gear. Knowing the number of teeth which the sunwheel and the ring gear have makes it possible to determine during operation the rotation speeds of the three components. According to the present invention, one of the planetary gear's components is connected to an output shaft of the engine. This component of the planetary gear therefore rotates at a speed corresponding to that of the engine output shaft. A second component of the planetary gear is connected to an input shaft of the gearbox. This component of the planetary gear therefore rotates at the same speed as the gearbox input shaft. A third component of the planetary gear is connected to a rotor of an electrical machine. This component of the planetary gear therefore rotates at the same speed as the electrical machine's rotor if they are connected directly to one another. Alternatively, the electrical machine may be connected to the third component of the planetary gear via a transmission which has a gear ratio, in which case the electrical machine and the third component of the planetary gear can rotate at different speeds. The speed of electrical machines can be regulated steplessly. In operating situations where a desired speed is to be imparted to the gearbox input shaft, a control unit uses knowledge of the engine's speed to calculate the speed at which the third component has to be driven for the gearbox input shaft to run at the desired speed. A control unit activates the electrical machine so that it imparts the calculated speed to the third component and hence the desired speed to the gearbox input shaft.

Further advantages of the invention are indicated by the detailed description set out below.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
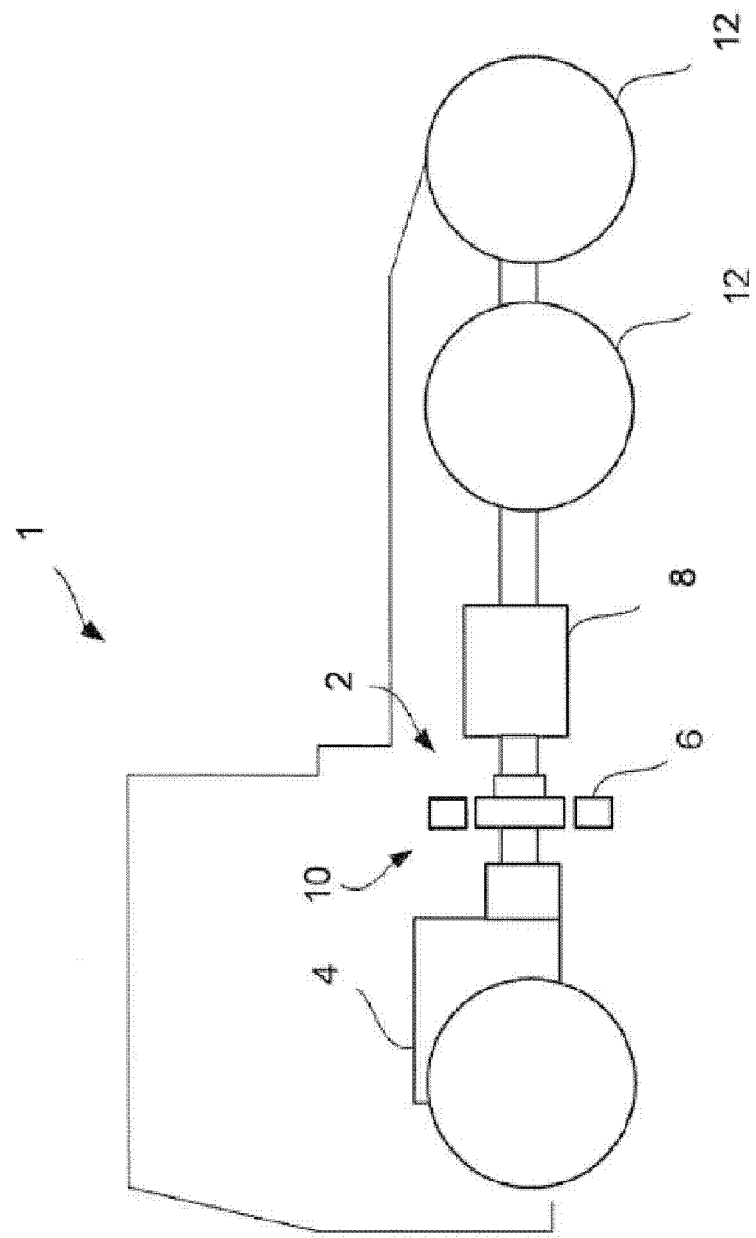
FIG. 1 depicts a vehicle in a side view with a propulsion device according to the present invention.

FIG. 1 is a side view of a vehicle 1 provided with a propulsion device 2 according to the present invention. A combustion engine 4 is connected to an electrical machine 6 and a gearbox 8 via a planetary gear 10. The gearbox is also connected to the vehicle's powered wheels 12.

Figure 2:
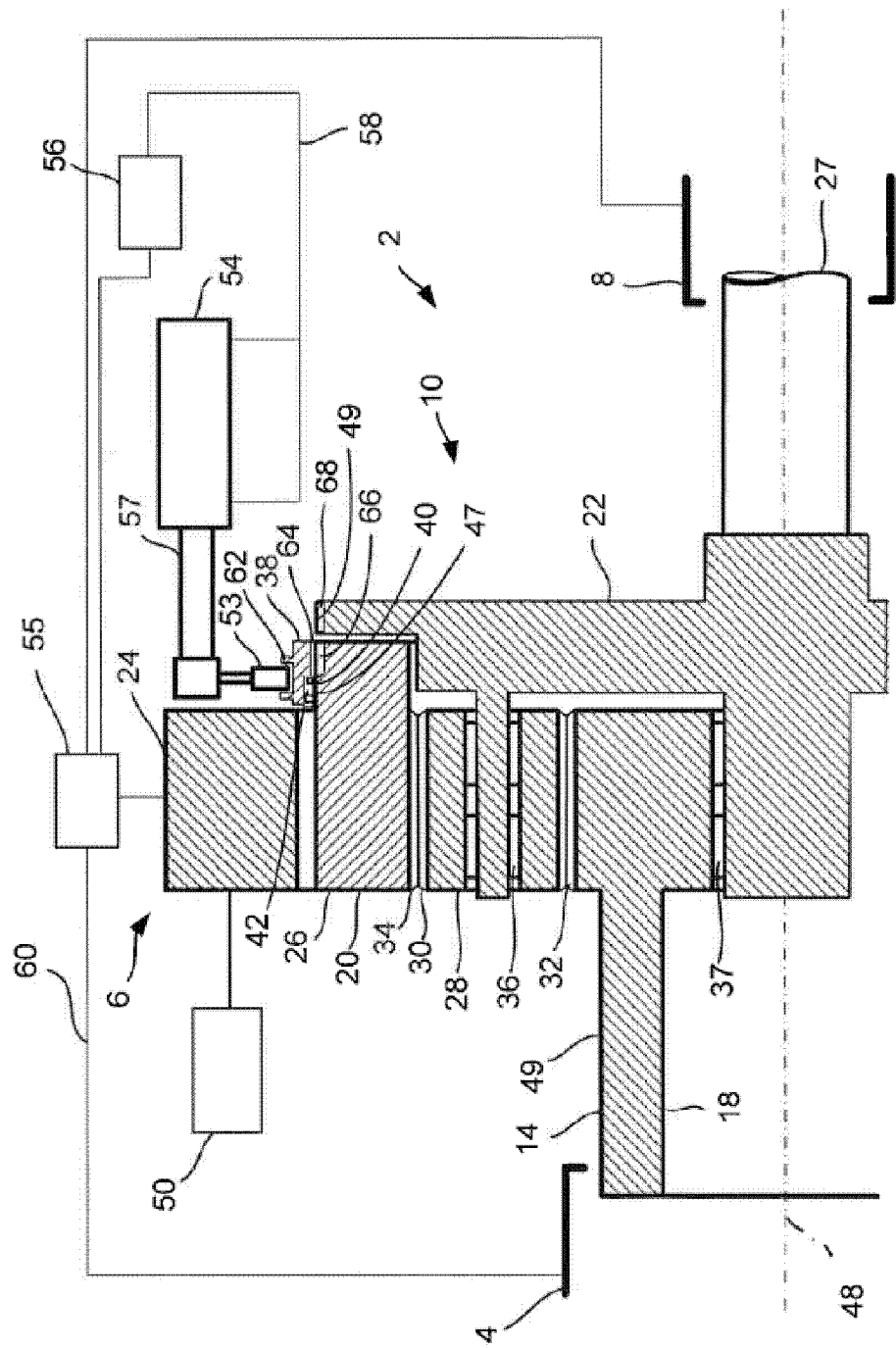
FIG. 2 is a cross-sectional view of the propulsion device according to the present invention with a locking sleeve in a first position.

FIG. 2 is a cross-sectional view of the propulsion device 2 according to the present invention. The planetary gear 10 comprises movable components in the form of a sunwheel 18, a ring gear 20 and a planet wheel carrier 22. In the embodiment depicted, the sunwheel 18 is connected to the engine output shaft 14 to form a composite unit. It is also possible to connect the engine output shaft 14 to the ring gear 20 or the planet wheel carrier 22. The sunwheel 18 is then connected to the electrical machine 6 or the gearbox 8. This results in different gear ratios depending on which components of the planetary gear 10 are connected to the engine 4, the electrical machine 6 or the gearbox 8.

The electrical machine 6 comprises a stator 24 and a rotor 26. The stator 24 is firmly connected to the vehicle and therefore does not rotate. The rotor is connected to the planetary gear's ring gear 20 and can therefore rotate relative to the stator. In the embodiment example depicted, the ring gear 20 and the electrical machine's rotor 26 form a composite unit but it is also possible for them to be separate units connected to one another.

An input shaft 27 of the gearbox 8 is connected to the planet wheel carrier which comprises a number of gearwheels referred to as planet wheels 28 which are supported on the planet wheel carrier by, for example, rolling bearings 36. In the embodiment depicted, the sunwheel 18 is likewise supported on the planet wheel carrier by rolling bearings 37. The teeth 30 of the planet wheels 28 engage with respective teeth 32, 34 on the sunwheel 18 and the ring gear 20.

During engine braking, the driver releases the vehicle's accelerator pedal (not depicted). The gearbox input shaft 27 then drives the electrical machine 6 while at the same time the engine 4 and the electrical machine 6 apply engine braking. In this situation the electrical machine 6 generates electrical energy which is then stored in an on-board battery 50. This operating state is referred to as regenerative braking. The electrical machine 6 thus serves as a generator and in so doing exerts a countertorque to the torque from the gearbox 8, causing the vehicle to be braked, since the gearbox is connected to the powered wheels.

During acceleration of the vehicle 1, an increased amount of torque has to be delivered from the engine 4 and the electrical machine 6 to the gearbox 8 and thence to the vehicle's powered wheels 12. Since both the engine and the electrical machine are connected to the planetary gear 10, the maximum torque deliverable by the engine 4 and the electrical machine 6 is limited by whichever of these prime movers 4, 6 has a lower maximum torque than the other. Should the electrical machine's maximum torque be lower than that of the engine, the electrical machine will not be able to generate sufficient reaction torque to the planetary gear, with the result that the engine cannot transmit its maximum torque to the gearbox and thence to the powered wheels. The maximum torque transferrable to the gearbox is therefore limited by the power of the electrical machine. In particular, when powerful acceleration of the vehicle is desired and the electrical machine is not able to generate sufficient reaction torque, undesirable heat will be generated in the electrical machine.

Connecting the engine output shaft 14 to the gearbox input shaft 27 by means of a locking sleeve 38 via the planetary gear 10 makes it possible to achieve desired acceleration of the vehicle and at the same time limit the electrical machine's dimensions and power, resulting in a compact propulsion device 2 with limited dimensions. It also means that the maximum torque which the electrical machine can generate may be lower than that which can be generated by the engine.

The locking sleeve 38 is movable between first and second positions. The first position causes the engine output shaft 14 and the gearbox input shaft 27 to rotate at different speeds via the planetary gear 10. In its second position, the locking sleeve 38 connects the engine output shaft 14 firmly to the gearbox input shaft 27 via the planetary gear 10.

The locking sleeve 38 is provided with splines 64 which in the first position engage with splines 66 on the ring gear 20. In the second position the locking sleeve's splines 64 can engage also with splines 68 on the planet wheel carrier. The locking sleeve takes the form of an annular sleeve which can substantially concentrically surround a portion 47 of the ring gear's periphery and a portion 49 of the planet wheel carrier's periphery. The splines 64 are on an internal circumference of the locking sleeve and have an axial extent which enables them simultaneously to engage with the splines on the ring gear 20 and on the planet wheel carrier 22. The splines 66 with which the ring gear is provided are preferably in an outer periphery of the ring gear. The splines 68 with which the planet wheel carrier is provided are preferably in an outer periphery of the planet wheel carrier. The result is a large torque arm for transfer of torque by the locking sleeve.

The engine output shaft 14, the electrical machine's rotor 26, the gearbox input shaft 27 and the locking sleeve 28 are arranged for rotation about a common axis of rotation 48.

The locking sleeve 38 is shiftable axially along the periphery of the ring gear 20 and the periphery of the planet wheel carrier 22 when moving between the first and second positions. A shift fork 53 is provided to move the locking sleeve between the first and second positions. The shift fork runs in a groove 62 provided in the locking sleeve's outer periphery. The shift fork is preferably controlled by a pneumatic cylinder 54 connected to a compressed air source 56. The pneumatic cylinder has a piston rod 57 on which the shift fork is mounted.

To shift and move the locking sleeve 38 from the first position to the second, the engine 4 and the electrical machine 6 are controlled in such a way that a torque-free state is created between the engine output shaft 14 and the planetary gear 10. This involves using a control unit 55 which is also adapted to causing the electrical machine 6 in certain appropriate operating situations to use stored electrical energy for providing the gearbox input shaft 27 with driving force, and in other operating situations to use the kinetic energy of the gearbox input shaft to generate and store electrical energy. The control unit 55 therefore monitors the rotation speeds and/or torques of the engine output shaft 14, the gearbox input shaft 27 and the electrical machine's rotor 26 as a basis for controlling the engine and the electrical machine in such a way that a torque-free state is created between the engine output shaft and the gearbox input shaft. When the torque-free state is achieved, the locking sleeve 38 is shifted and moved to the second position by the control unit activating the compressed air source 56 to supply compressed air to the pneumatic cylinder 54 via a line 58 so that the cylinder pushes the locking sleeve by means of the fork 53. The control unit 55 is connected to the engine 4, the gearbox 8, the electrical machine 6 and the compressed air source 56 via electrical conductors 60. The control unit thus controls the movement of the locking sleeve 38. It is also possible to provide a separate control unit for the compressed air source.

The control unit 55 is thus adapted to controlling the locking sleeve 38 and also to deciding when the electrical machine 6 is to serve as motor and when as generator. To decide this, the control unit may receive current information from suitable operating parameters indicated above. The control unit may be a computer with suitable software for this purpose. The control unit controls also the flow of electrical energy between the battery 50 and the electrical machine's stator 24. At times when the electrical machine serves as motor, stored electrical energy is supplied from the battery to the stator. At times when the electrical machine serves as generator, electrical energy is supplied from the stator to the battery.

Figure 3:
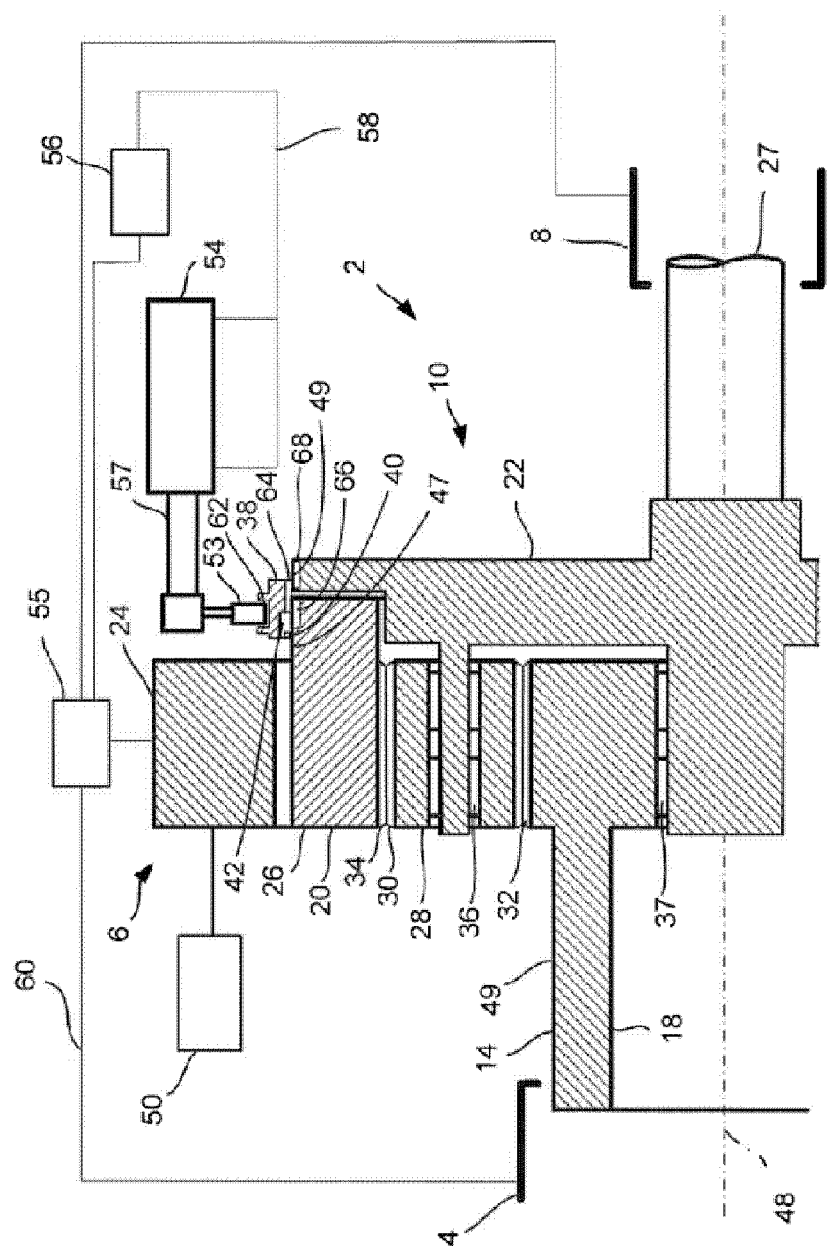
FIG. 3 is a cross-sectional view of the propulsion device according to the present invention with the locking sleeve in a second position.

FIG. 3 is a cross-sectional view of the propulsion device 2 according to the present invention with the locking sleeve 38 in the second position in which the engine output shaft 14 and the gearbox input shaft 27 are firmly connected to one another by the locking sleeve via the planetary gear 10. To make this movement of the locking sleeve possible, the control unit 55 will first control the engine and the electrical machine in such a way that a torque-free state is created between the engine output shaft 14 and the gearbox input shaft 27, as explained above in relation to FIG. 2.

When the vehicle has been accelerated to desired speed, the shift fork 53 is controlled in such a way that the locking sleeve 38 is returned to the first position. At the same time, the engine and the electrical machine are controlled by the control unit 55 in such a way that a torque-free state is created between the engine output shaft 14 and the gearbox input shaft 27. When the torque-free state is achieved, the locking sleeve is shifted and moved to the first position. When the locking sleeve has been returned to the first position, the vehicle can be powered by both the engine and the electrical machine.

Figure 4:
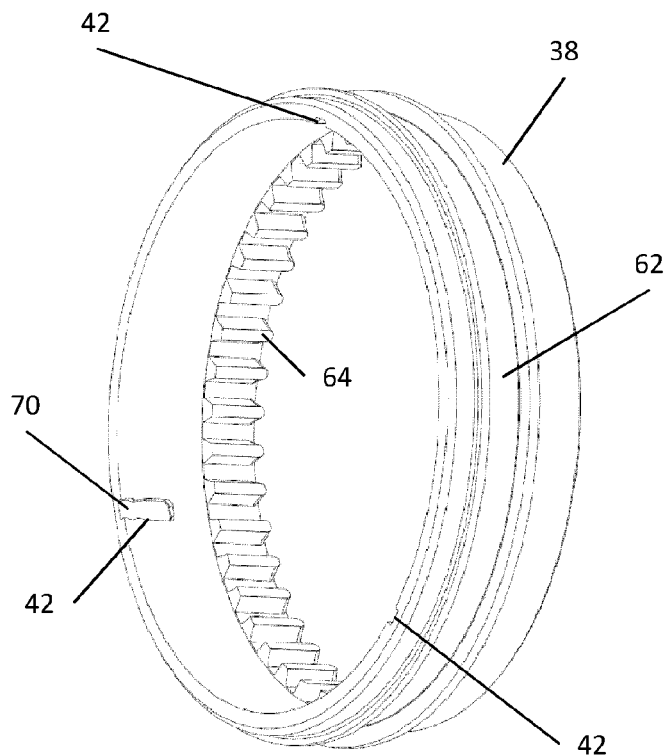
FIG. 4 is a perspective view of the locking sleeve according to the present invention.

FIG. 4 is a perspective view of the locking sleeve 38 according to the present invention. It takes the form of an annular sleeve with splines 64 on an internal circumference. The diagram also shows the groove 62 provided for the shift fork in the outer periphery of the sleeve. The sleeve's internal circumference surface is provided with at least one recess 42 in which at least one spigot 40 on the ring gear's outer periphery is configured to engage as depicted in FIGS. 2 and 3. In FIG. 4 three recesses 42 are spaced evenly round the sleeve. The spigots 40 have to correspond in number and spacing on the periphery of the ring gear 20. The recesses 42 have an axial extent and are so configured that the locking sleeve is kept in the second position when the spigots 40 are inserted in a locking portion 70 in the recesses 42.

Figure 5:
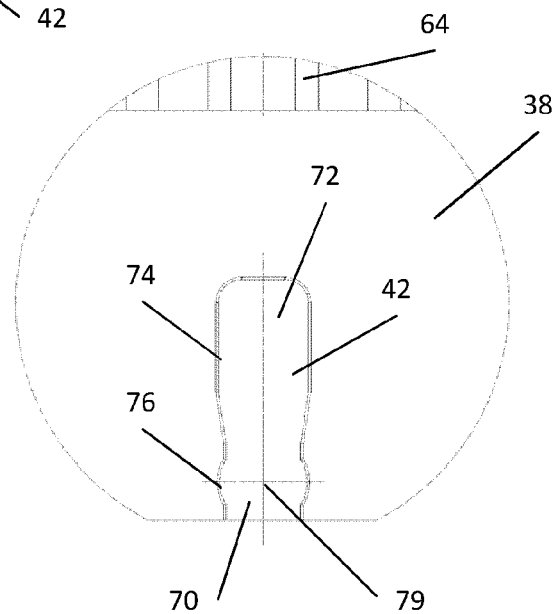
FIG. 5 is a detailed view of a recess in the locking sleeve according to the present invention.

FIG. 5 is a detail view of a recess 42 in the locking sleeve 38 according to the present invention. This recess runs in the sleeve's axial extent. The recess is provided with an elongate portion 72 with substantially parallel opposite first wall surfaces 74 spaced at a distance which is greater than both the diameter of the spigot 40 and the play in the splined connections 64, 66, 68. In the first position the spigot 40 is thus prevented from abutting and chafing against the first wall surfaces 74 of the recess 42. The elongate portion 72 links to a locking portion 70 which has wall surfaces 76 situated opposite to and at a distance from one another and has a radius substantially corresponding to that of the spigot 40. The distance between the locking portion's second wall surfaces 76 is greater than the diameter of the spigot 40. The locking portion is so situated relative to the locking sleeve's splines 64 that when the spigot 40 is at the centre 79 of the locking portion, in the sleeve's axial direction, the fork 53 does not abut against the sleeve's external groove 62. The elongate portion 72 of the recess 42 is situated between the splines 64 of the locking sleeve 38 and the locking portion 70 of the recess 42.

When the locking sleeve 38 is to be moved from the first position to the second, the engine 4 and the electrical machine 6 are at first controlled so that a substantially torque-free state occurs between the ring gear 20 and the planet wheel carrier 22. The compressed air cylinder 54 is then operated so that the fork 53 moves the locking sleeve. The recess 42 is thus moved from a position in which the spigot 40 is nearest to the locking sleeve's spline 64 to a position in which the spigot is close to the centre of the locking portion 70, in the locking sleeve's axial direction. When the locking sleeve's splines 64 come into engagement with the planet wheel carrier's splines 68, torque occurs on the sleeve, resulting in a force in its circumferential direction, i.e. perpendicular to the extent of the recess 42. The locking portion's second wall surfaces 76 then come into contact with the spigot's outer peripheral surface, which thus becomes centred in the locking portion. It is therefore not important for the fork 53 to move the sleeve 38 to exactly the correct position, since the configuration of the second wall surfaces 76 of the recess 42 automatically causes the spigot 40 to assume the correct position. When the spigot is at the centre 79 of the locking portion 70, in the locking sleeve's axial direction, the fork does not abut against the locking sleeve's external groove 62, so no friction occurs between these components. In the locking sleeve's circumferential direction, however, there is no need for the spigot to be centred in the locking portion to prevent the fork from abutting against the locking sleeve's external groove 62.

To be able to move the locking sleeve 38 axially from the second position to the first, the engine 4 and the electrical machine 6 are controlled in such a way that a substantially torque-free state occurs between the ring gear 20 and the planet wheel carrier 22. In the torque-free state the locking portion 70 in the recess 42 will be able to leave the spigot 40, with the result that the locking sleeve can be moved axially by means of the fork 53.

Figure 6:
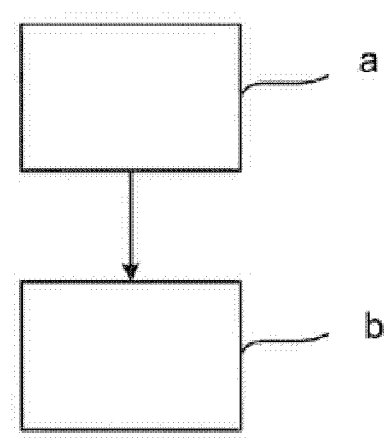
FIG. 6 is a flowchart illustrating a method for controlling the propulsion device according to the present invention.

FIG. 6 is a flowchart illustrating a method for control of a propulsion device 2 according to the present invention. The method according to the invention is characterised by the steps of a) the engine 4 and the electrical machine 6 being controlled in such a way that a substantially torque-free state is created between the engine output shaft 14 and the gearbox input shaft 27, and b) the engine output shaft 14 and the planetary gear 10 being firmly connected to one another by a locking sleeve 38 being moved from a first position in which the engine output shaft 14 and the gearbox input shaft 27 are caused to rotate at different speeds via the planetary gear 10, to a second position in which the locking sleeve firmly connects the engine output shaft to the gearbox input shaft via the planetary gear.

Components mentioned and features indicated above may within the scope of the invention be combined among the various embodiments mentioned.

The invention claimed is:

1. A propulsion device for a vehicle comprises:
an output shaft of a combustion engine;
an input shaft of a gearbox;
an electrical machine comprising a stator and a rotor;
a planetary gear comprising movable gear components;
a locking sleeve which is movable between first and second positions; in the first position, the locking sleeve engages with a first movable component of the planetary gear which are so configured that the engine output shaft and the gearbox input shaft are allowed to rotate at different speeds via the planetary gear, and in the second position, the locking sleeve engages with the first movable component and also with a second movable component of the planetary gear, and the first and second movable components are located and configured so that the locking sleeve firmly connects the engine output shaft to the gearbox input shaft via the planetary gear;
the electrical machine rotor is connected to the planetary gear's ring gear, the first movable component is connected to the electrical machine's rotor and the second movable component is connected to the gearbox input shaft.

2. A propulsion device according to claim 1, wherein the locking sleeve is located to surround the first and/or the second movable component the sleeve then is engaging;
the locking sleeve has an interior with splines, the first and the second movable components have respective exteriors with splines in the first position of the locking sleeve, the splines of the locking sleeve engage with the splines on the first movable component of the planetary gear, and in the second position of the locking sleeve, the splines of the locking sleeve engage also with the splines on the second movable component of the planetary gear.

3. A propulsion device according to claim 2, wherein the locking sleeve has at least one recess; at least one spigot on the first movable component is configured to engage in the at least one recess.

4. A propulsion device according to claim 3, wherein the at least one recess in the locking sleeve has an axial extent in the axial direction of the locking sleeve.

5. A propulsion device according to claim 3, herein the at least one recess in the locking sleeve is so configured that the locking sleeve is kept in the second position when the at least one spigot is inserted in a locking portion formed in the recess and when the locking sleeve and the second movable component rotate about a common axis of rotation.

6. A propulsion device according to claim 5, wherein the locking sleeve is shiftable axially along the ring gear and the planet wheel carrier during the movement of the locking sleeve between the first and second positions thereof.

7. A propulsion device according to claim 6, further comprising a shift fork configured to move the locking sleeve between the first and second positions.

8. A propulsion device according to claim 1, further comprising the first movable gear component is a ring gear and the second movable gear component is a planet wheel carrier.

9. A propulsion device according to claim 8, wherein the locking sleeve comprises an annular sleeve which in the second position thereof substantially concentrically surrounds at least a portion of the periphery of the ring gear and at least a portion of the periphery of the planet wheel carrier.

10. A propulsion device according to claim 9, further comprising:
the engine output shaft, the electrical machine's rotor, the gearbox input shaft and the locking sleeve are arranged for rotation about a common axis of rotation.

11. A propulsion device according to claim 1, further comprising a control unit configured for controlling the electrical machine so that in first operating situations the electrical machine uses stored electrical energy to impart driving force to the gearbox input shaft and in other operating situations the electrical machine uses the kinetic energy of the gearbox input shaft to generate and store electrical energy.

12. A method for controlling a propulsion device, wherein the propulsion device comprising:
an output shaft of a combustion engine;
an input shaft of a gearbox;
an electrical machine comprising a stator and a rotor and;
a planetary gear comprising movable gear components including a ring gear;
the method comprising the steps of:
controlling the engine and the electrical machine such that a substantially torque-free state is created between the engine output shaft and the gearbox input shaft; and
firmly connecting the engine output shaft and the planetary gear to one another by moving a locking sleeve from a first position, in which the engine output shaft and the gearbox input shaft are caused to rotate at different speeds via the planetary gear, to a second position in which the locking sleeve firmly connects the planetary gear's ring gear to the planet wheel carrier via splines.

13. A method according to claim 12, further comprising moving the locking sleeve from the first position to the second by a shift fork.

* * * * *